United States Patent
Nakano et al.

(10) Patent No.: US 7,671,828 B2
(45) Date of Patent: Mar. 2, 2010

(54) COLOR FILTER SUBSTRATE, LIQUID CRYSTAL UNIT, AND ELECTRONIC DEVICE

(75) Inventors: Tomoyuki Nakano, Azumino (JP); Keiji Takizawa, Azumino (JP); Hideki Kaneko, Torrori (JP)

(73) Assignee: Epson Imaging Devices Corporation, Azumino-shi (JP)

( * ) Notice: Subject to any disclaimer, the term of this patent is extended or adjusted under 35 U.S.C. 154(b) by 1035 days.

(21) Appl. No.: 11/365,916

(22) Filed: Mar. 2, 2006

(65) Prior Publication Data

US 2006/0197896 A1 Sep. 7, 2006

(30) Foreign Application Priority Data

Mar. 3, 2005 (JP) ............................. 2005-058467
Nov. 21, 2005 (JP) ............................. 2005-335466

(51) Int. Cl.
  *G09G 3/36* (2006.01)
(52) U.S. Cl. .................. 345/88; 349/105; 349/106; 349/107; 349/108; 349/109
(58) Field of Classification Search .................. 345/87, 345/88; 349/105–109
  See application file for complete search history.

(56) References Cited

U.S. PATENT DOCUMENTS

| 6,310,672 B1 | 10/2001 | Koike et al. | |
| 7,053,974 B2 * | 5/2006 | Hwang | 349/155 |
| 7,123,327 B2 * | 10/2006 | Otake | 349/114 |
| 7,535,545 B2 * | 5/2009 | Moon et al. | 349/187 |
| 2003/0038904 A1 * | 2/2003 | Kaneko et al. | 349/110 |
| 2005/0110923 A1 * | 5/2005 | Yamashita et al. | 349/107 |

FOREIGN PATENT DOCUMENTS

| JP | A-07-168014 | 7/1995 |
| JP | A 8-68995 | 3/1996 |
| JP | A 8-184822 | 7/1996 |
| JP | A 11-202318 | 7/1999 |
| JP | A 11-337725 | 12/1999 |
| JP | A-2000-194286 | 7/2000 |
| JP | A 2002-258029 | 9/2002 |
| JP | A 2003-161933 | 6/2003 |
| JP | A 2003-302516 | 10/2003 |
| JP | A-2004-45782 | 2/2004 |
| JP | A-2004-151299 | 5/2004 |
| JP | A-2004-334090 | 11/2004 |
| JP | 2005-025003 | 1/2005 |
| JP | A-2005-25002 | 1/2005 |
| JP | A-2005-49791 | 2/2005 |

* cited by examiner

*Primary Examiner*—Sumati Lefkowitz
*Assistant Examiner*—Ke Xiao
(74) *Attorney, Agent, or Firm*—Oliff & Berridge, PLC

(57) ABSTRACT

A color filter substrate includes a substrate and color layers of different colors which are disposed on the substrate. The color layers are provided in unit pixels. The unit pixels each include subpixels. The subpixels each include a reflection region where light entering the pixels is reflected and a transmission region where light entering the pixels is transmitted. The reflection and transmission regions include a different combination of two color layers selected from the color layers for each of the subpixels. The two color layers are adjacent to each other in a plane in the reflection region and are stacked on top of each other in the transmission region. The transmission region of at least one of the subpixels has an unstacked area where one of the two color layers is formed.

13 Claims, 11 Drawing Sheets

COLOR FILTER SUBSTRATE, LIQUID CRYSTAL UNIT, AND ELECTRONIC DEVICE

This application claims the benefit of Japanese Patent Application No. 2005-58467, filed Mar. 3, 2005 and Japanese Patent Application No. 2005-335466, filed Nov. 21, 2005. The entire disclosure of the prior applications is hereby incorporated by reference herein in its entirety.

BACKGROUND

1. Technical Field

The present invention relates to color filter substrates, liquid crystal units, and electronic devices.

2. Related Art

Transflective liquid crystal units are known, which have both transmissive display regions for display with light from an artificial light source and reflective display regions for display with external light such as sunlight. These liquid crystal units consume a smaller amount of power than transmissive displays, which must continuously keep a light source on, because they can provide sufficient visibility for display in a dark place and utilize external light for display in a light place.

In the transmissive display mode of transflective liquid crystal units, light from a backlight passes through color layers of a color filter only once to exit to the viewer side. In the reflective display mode, on the other hand, external light passes through color layers of a color filter before and after being reflected by a reflective member, namely twice in total, to exit to the viewer side. As a result, external light and light from a backlight have different densities after passing through color layers. The color layers of transflective liquid crystal units therefore require a larger thickness in the transmissive display regions than in the reflective display regions to inhibit the difference in color between the transmissive display and the reflective display and thereby achieve a uniform density. In addition, three color layers corresponding to red, green, and blue must be provided in both transmissive display regions and reflective display regions to provide full-color display; therefore, photolithography must be performed six times in total to form color layers of the three colors with different thicknesses in the transmissive display regions and the reflective display regions.

Recently, JP-A-2003-161933, for example, has proposed a transflective liquid crystal unit having transmissive display regions each of which includes stacked color layers of two colors selected from the group of cyan, yellow, and magenta and reflective display regions each of which includes two different color layers arranged in a single layer. This liquid crystal unit can mix two colors selected from the group of cyan, yellow, and magenta to provide red, green, and blue display colors; therefore, this unit requires half the number of photolithography steps.

SUMMARY

The inventors, however, have found that the liquid crystal unit according to the above patent document has difficulty in adjusting and stabilizing the tones of the display colors. An advantage of the present invention is that it provides a color filter substrate, a liquid crystal unit, and an electronic device that can adjust and stabilize the tones of display colors to provide a suitable white balance demanded for full-color display.

In view of the color design of full-color displays, the inventors have studied the color wavelengths and white balance of three color layers, which are properties demanded for providing display with suitable tones. As a result of the study, the inventors have identified the problems that no typical color materials used for color layers have color wavelengths suitable for providing ideal full-color display and that the adjustment of white balance depends on the selection of color materials. Such problems result in less flexibility in color design. According to the patent document mentioned above, two colors selected from the group of cyan, yellow, and magenta are mixed to provide red, green, and blue display colors. The inventors, however, have revealed that the above patent document cannot solve the problems of the inherent properties of color materials, the adjustment of white balance, and the flexibility of color design. According to the above patent document, additionally, unstable color tones result from simple misalignment in the formation of color layers because the liquid crystal unit includes stacked color layers and color layers arranged in a single layer. Accordingly, the inventors have conceived the present invention in light of the above problems.

That is, a color filter substrate according to a first aspect of the invention includes a substrate and color layers of different colors which are disposed on the substrate. The color layers are provided in unit pixels. The unit pixels each include subpixels. The subpixels each include a reflection region where light entering the pixels is reflected and a transmission region where light entering the pixels is transmitted. The reflection and transmission regions include a different combination of two color layers selected from the color layers for each of the subpixels. The two color layers are adjacent to each other in a plane in the reflection region and are stacked on top of each other in the transmission region. The transmission region of at least one of the subpixels has an unstacked area where one of the two color layers is formed.

The reflection region is a region where the two adjacent color layers are formed on a reflective member. In the reflection region, light entering the color filter substrate from the viewer side passes through the color layers to reach the reflective member, which then reflects the light to the viewer side. When viewed microscopically, the two color layers in the reflection region are not stacked on top of each other; when viewed macroscopically, however, the reflected light passing through the two color layers has a mixture of the two colors. The reflection region can therefore provide a mixed tone of the two colors.

The transmission region is a region where the two layers are stacked on top of each other on a transparent member. In the transmission region, light entering the color filter substrate from the viewer side passes through the transparent member and the color layers to exit to the viewer side. The transmission region can therefore provide a mixed tone of the two colors. In addition, the transmission region of at least one of the subpixels has an unstacked area where one of the two color layers is formed. In other words, the transmission region of at least one of the subpixels includes an area where the two color layers are stacked on top of each other and an area including a single color layer (an area where one of the two color layers is formed). Monochrome light can be transmitted in the area including a single color layer. Accordingly, the transmission region can simultaneously provide light of a mixture of the two colors, which is provided by the two color layers, and monochrome light, which is provided by the single color layer. The aperture area of the single color layer can be adjusted by forming the color layer in a suitable planar shape to control the balance between the mixed color and the single color in the transmission region and thus control the tone thereof. This increases the flexibility of color design in the transmission region.

The tone of the transmission region can thus be readily controlled for each unit pixel to provide display colors with a suitable white balance. When the color filter substrate is viewed macroscopically, the individual unit pixels have suitable tones to provide a good white balance and higher image quality. According to the patent document mentioned above, in contrast, only monochrome regions and mixed color regions are formed, and no design is proposed to provide a suitable tone and white balance for each unit pixel. According to the first aspect of the present invention, both the area where the two color layers are stacked on top of each other and the area where the single color layer is formed are provided in the transmission region to control the tone thereof. This enables color design with high flexibility.

In the color filter substrate according to the first aspect of the invention, the unstacked area where one of the two color layers is formed is preferably provided on both sides of the transmission region. In addition, the unstacked area where one of the two color layers is formed is preferably a cutout portion of the other color layer in the transmission region or an opening provided in the other color layer in the transmission region.

The sides of the transmission region mean those in the longitudinal or lateral direction of the subpixels. In the above case, the unstacked area where one of the two color layers is formed, namely a monochrome portion, corresponds to the opening provided in the other color layer in the transmission region.

In the patterning of the color layers, the alignment of a photomask may deviate in the longitudinal or lateral direction of the subpixel regions. In that case, the area of the monochrome portion on one side increases while the area of the monochrome portion on the other side decreases, and the increase in aperture area is equal to the decrease in aperture area; that is, the aperture area does not change even if the alignment deviates. The above structure can therefore tolerate the deviation of alignment of a photomask, and thus causes no deviation in the balance between the mixed color and the single color in the transmission region due to variations in the aperture area of the monochrome portions. Accordingly, the transmission region can stabilize the balance between the mixed color and the single color to stabilize the tone and white balance of the color filter substrate.

The length of the monochrome portions formed on both sides of the transmission regions is preferably smaller than that of the sides of the transmission regions. If openings are formed over the length of the sides of the transmission region as the monochrome portions, that is, if the length of the monochrome portions is the same as that of the sides of the transmission region, the total aperture area of the openings does not change after the deviation of the alignment of a photomask, but the cancelled amounts of increase and decrease in aperture area increase. If, on the other hand, cutout portions are formed on both sides of the transmission region as the monochrome portions, that is, if the length of the monochrome portions is smaller than that of the sides of the transmission region, the total aperture area of the monochrome portions does not change after the deviation of the alignment of a photomask, and the cancelled amounts of increase and decrease in aperture area can be smaller than those in the above case. The monochrome portions formed on both sides of the transmission region preferably have a semicircular or rectangular opening (cutout) shape.

In the color filter substrate according to the first aspect of the invention, the colors of the color layers may be cyan, yellow, and magenta. A reflection region including adjacent cyan and yellow color layers provides green reflected light when viewed macroscopically. A reflection region including adjacent yellow and magenta color layers provides red reflected light when viewed macroscopically. A reflection region including adjacent cyan and magenta color layers provides blue reflected light when viewed macroscopically.

On the other hand, a transmission region including stacked cyan and yellow color layers provides green reflected light when viewed macroscopically. A transmission region including stacked yellow and magenta color layers provides red reflected light when viewed macroscopically. A transmission region including stacked cyan and magenta color layers provides blue reflected light when viewed macroscopically. In addition, the transmission region of at least one of the subpixels includes the monochrome portion described above to provide both mixed color light and monochrome light of cyan, yellow, or magenta.

Furthermore, as described above, the monochrome portion of the transmission region enables the adjustment of the tones of the individual colors, namely red, green, and blue, to provide a color filter substrate with a suitable white balance.

The color filter substrate according to the first aspect of the invention may further include a reflective film provided in the reflection region. The reflective film is disposed between the two color layers and the substrate.

Light entering the color filter substrate from the outside (from the viewer side) passes through the color layers to reach the reflective film, which then reflects the light to the outside. The color filter substrate can therefore provide reflective display with external light.

In the color filter substrate according to the first aspect of the invention, the two color layers in the reflection region of at least one of the subpixels may have different surface areas. If the two color layers in the reflection region have different surface areas, one of the two color layers with a larger surface area can transmit a larger amount of light than the other with a smaller surface area. As is obvious from a comparison with two color layers with the same surface area, when viewed macroscopically, the two color layers with different surface areas provide light of a mixed color containing the two colors in a ratio varying depending on the surface areas. If color layers with different surface areas are formed in the reflection region, the balance between the two colors can be adjusted to control the tone of the mixed color. Specifically, the tones of red, green, and blue can be controlled in the reflection region. The above structure can therefore control the tone of the reflection region, as well as the tone of the transmission region, to provide a color filter substrate with a suitable white balance.

In the color filter substrate according to the first aspect of the invention, the two color layers may be formed across the boundaries between the adjacent subpixels. In this case, the color layers alone can constitute the reflection regions and the transmission regions of the subpixels. A first color layer and a second color layer are formed on both sides of each subpixel across the boundaries between the adjacent subpixels to constitute the reflection regions and the transmission regions of the subpixels.

The color filter substrate according to the first aspect of the invention may further include a thickness-adjusting portion disposed between the color layers and the substrate in the reflection region to adjust the thickness of the color layers. This thickness-adjusting portion is disposed between the color layers and the substrate of the color filter substrate in the reflection region to adjust the thickness of the color layers in the reflection region and the transmission region. Unless the thickness-adjusting portion is provided, a step is formed between the transmission region, where the color layers are stacked on top of each other, and the reflection region, where the color layers are adjacent to each other. The stepped area can be lifted by the thickness-adjusting portion so that the color layers can have the same height from the substrate in the area of the transmission region where the monochrome portion is not formed, that is, where the color layers are stacked on top of each other, and in the reflection region. In addition, the thickness-adjusting portion has a fine irregular surface on which the reflective film is formed to scatter light in the reflection region.

The color filter substrate according to the first aspect of the invention may further include a planarizing layer covering the top color layers in the reflection region and the transmission region. The planarizing layer is preferably formed by a wet process. Because the monochrome portion is provided in the transmission region of the color filter substrate, as described above, a step is formed between the area where the monochrome portion is formed and the area where the monochrome portion is not formed (the area where the two color layers are stacked on top of each other). The area where the monochrome portion is formed can be filled with the planarizing layer to provide a flat surface over the transmission region. Though the thickness-adjusting portion lifts the step between the transmission region and the reflection region, the thickness-adjusting portion alone has difficulty in allowing the color layers to have the same thickness in the transmission region and the reflection region. The difficulty is due to variations in the thickness and flatness of the color layers and the adjustment of color design. The planarizing layer can reliably form a flat surface over the top color layers in the transmission region and the reflection region. If the planarizing layer is formed by a wet process, the planarizing layer can smoothly cover the area where the monochrome portion is formed and irregularities on the top color layers in the transmission region and the reflection region to achieve a more significant planarizing effect.

In the color filter substrate according to the first aspect of the invention, the yellow color layer preferably has the smallest area among the cyan, yellow, and magenta color layers in the reflection region and the transmission region. The inventors have confirmed that a unit pixel in which the yellow color layer has a large surface area cannot achieve a suitable white balance because the color triangle of the unit pixel, which is composed of cyan, yellow, and magenta, tends to show an uneven distribution on the yellow side. The uneven distribution can be avoided by minimizing the area of the yellow color layer to achieve a color triangle with a suitable white balance.

While a suitable white balance can be achieved effectively by minimizing the area of the yellow color layer, the achievement of a suitable white balance can be complemented by adjusting the areas of the cyan and magenta color layers. The inventors have found that a color triangle with an uneven distribution on the yellow side can be roughly avoided by increasing the area of the magenta color layer, though maximizing the area of the magenta color layer cannot necessarily realize a suitable white balance. The inventors have also confirmed that there is no exclusive relationship between the area of the magenta color layer and the achievement of a suitable white balance. Accordingly, the achievement of a suitable white balance by minimizing the area of the yellow color layer can be complemented by adjusting the areas of the cyan and magenta color layers.

A liquid crystal unit according to a second aspect of the invention includes a pair of substrates facing each other, a liquid crystal layer held between the substrates, a reflective film, and color layers of different colors which are provided in unit pixels. The unit pixels each include subpixels. The subpixels each include a reflection region where light entering the pixels is reflected and a transmission region where light entering the pixels is transmitted. The reflection and transmission regions include a different combination of two color layers selected from the color layers for each of the subpixels. The two color layers are adjacent to each other in a plane in the reflection region and are stacked on top of each other in the transmission region. The transmission region of at least one of the subpixels has an unstacked area where one of the two color layers is formed. The liquid crystal unit, which includes the color filter substrate described above, can control color tones to achieve display colors with a suitable white balance.

An electronic device may have a display including the liquid crystal unit described above. The electronic device is exemplified by information processors such as cellular phones, mobile information terminals, watches, word processors, and personal computers. The electronic device, which has the display including the liquid crystal unit described above, can control the tones of the display to achieve display colors with a suitable white balance.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A liquid crystal unit according to a first embodiment of the present invention will now be described with reference to the drawings, in which layers and members are illustrated on different scales so as to have visible sizes.

The liquid crystal unit described below is an active-matrix unit including thin-film diodes (hereinafter abbreviated as TFDs) as switching elements. The liquid crystal used is of twisted nematic (TN) mode. In particular, the liquid crystal unit according to this embodiment is a transflective liquid crystal unit, which provides reflective display with external light and transmissive display with light from a backlight.

Figure 1:
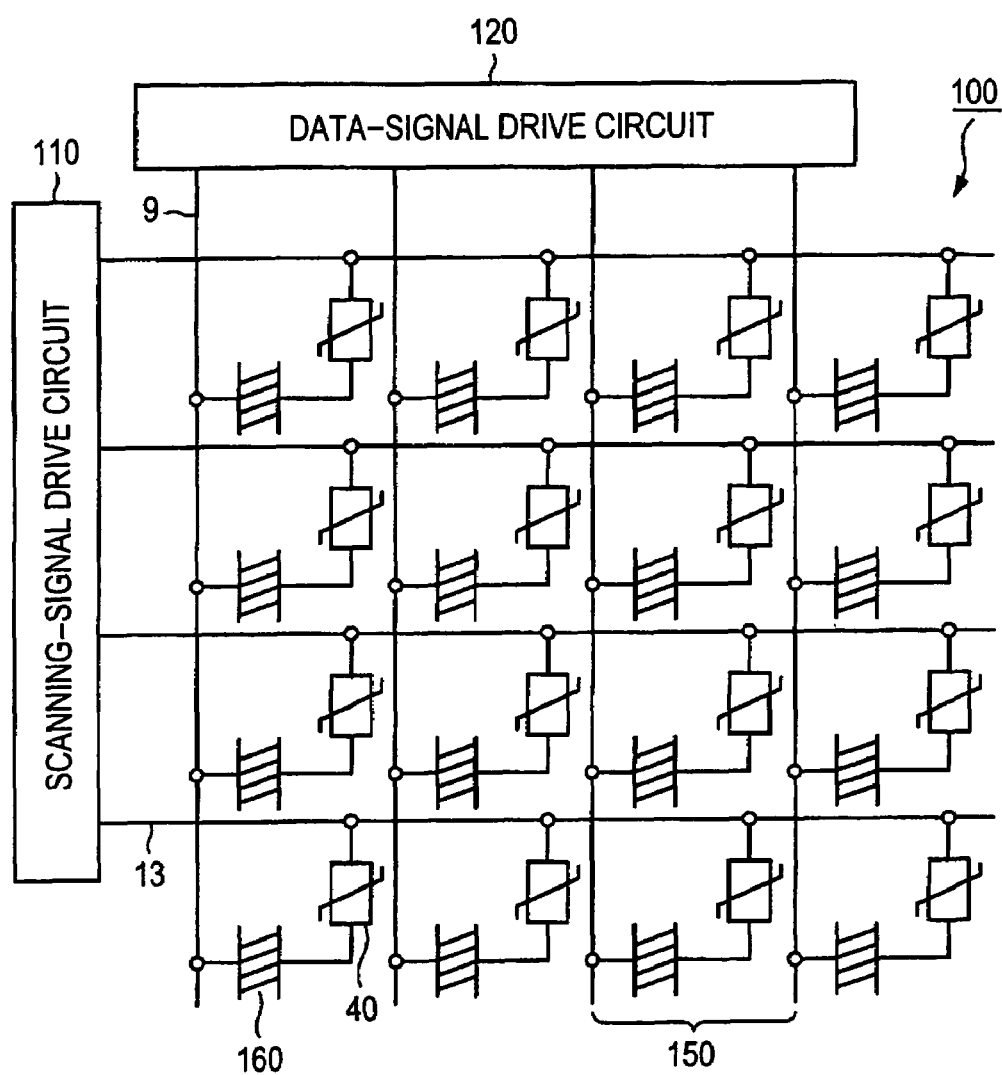
FIG. 1 is an equivalent circuit diagram of a liquid crystal unit according to a first embodiment of the present invention.

FIG. 1 is an equivalent circuit diagram of the liquid crystal unit according to this embodiment. In FIG. 1, a liquid crystal unit 100 has a scanning-signal drive circuit 110 and a data-signal drive circuit 120. The liquid crystal unit 100 includes scanning lines 13 and data lines 9 perpendicular to the scanning lines 13 as signal lines. The scanning lines 13 are driven by the scanning-signal drive circuit 110 while the data lines 9 are driven by the data-signal drive circuit 120. Each pixel region 150 includes a TFD 40 and a liquid crystal display element 160 (a liquid crystal layer 50 described later) that are connected in series to the scanning lines 13 and the data lines 9. In FIG. 1, the TFDs 40 are connected to the scanning lines 13 while the liquid crystal display elements 160 are connected to the data lines 9, though the reverse connection is permitted; that is, it is possible to connect the TFDs 40 to the data lines 9 and the liquid crystal display elements 160 to the scanning lines 13.

Figure 2:
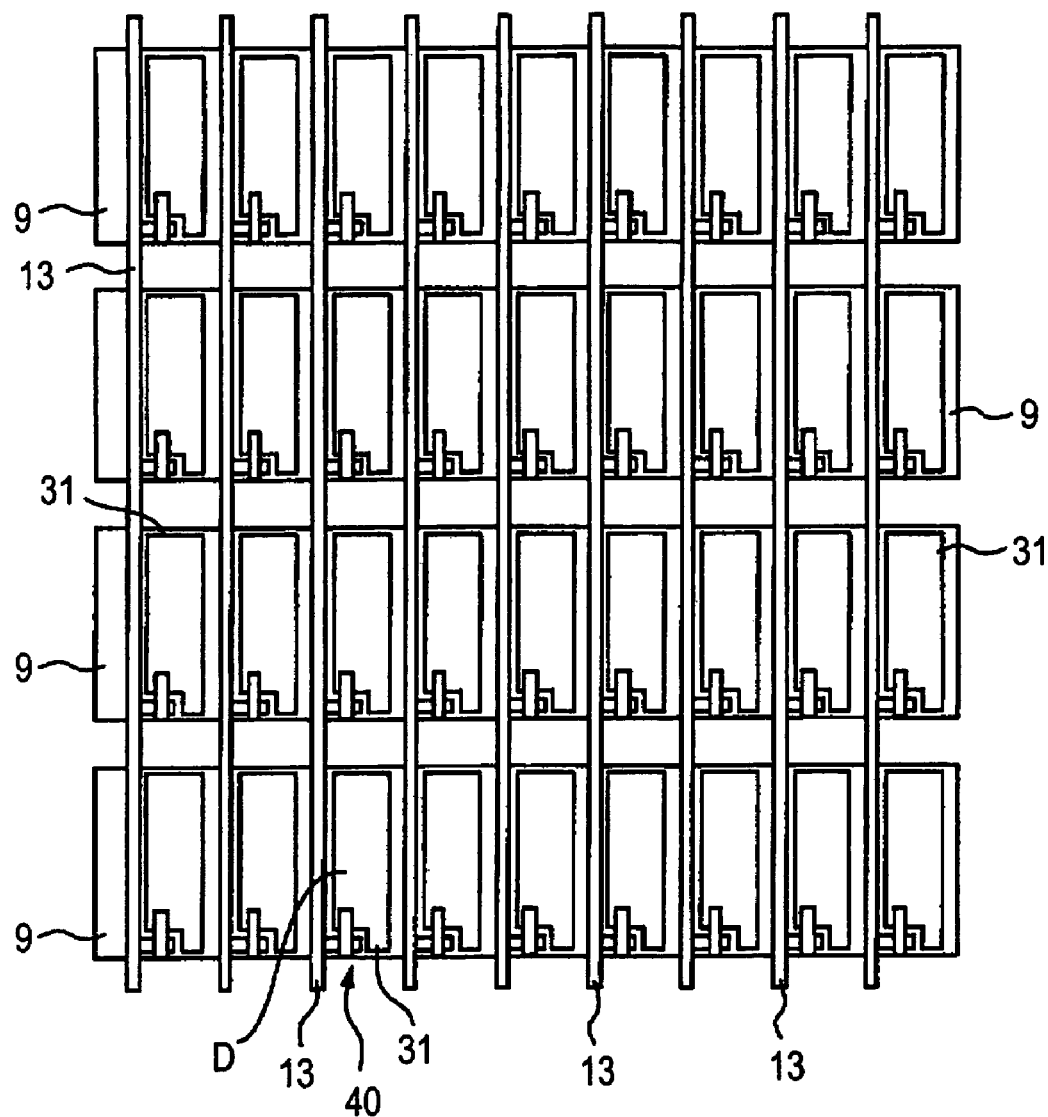
FIG. 2 is a schematic plan view illustrating the electrode structure of the liquid crystal unit according to the first embodiment of the invention.

The planar structure of electrodes provided on the liquid crystal unit 100 according to this embodiment is then described below with reference to FIG. 2. In FIG. 2, pixel electrodes (first electrodes) 31 arranged in a matrix are connected to the scanning lines 13 through the TFDs 40. Common electrodes (second electrodes) 9 are provided in strip form such that the surfaces thereof face the pixel electrodes 31 in the direction perpendicular to the page. The common electrodes 9, which correspond to the data lines 9 in FIG. 1, are formed in a stripe pattern perpendicular to the scanning lines 13. In this embodiment, the individual regions where the pixel electrodes 31 are provided are subpixel regions (dot regions) D. The subpixel regions D, which are arranged in a matrix, include the TFDs 40 to independently provide display.

Figure 3A:
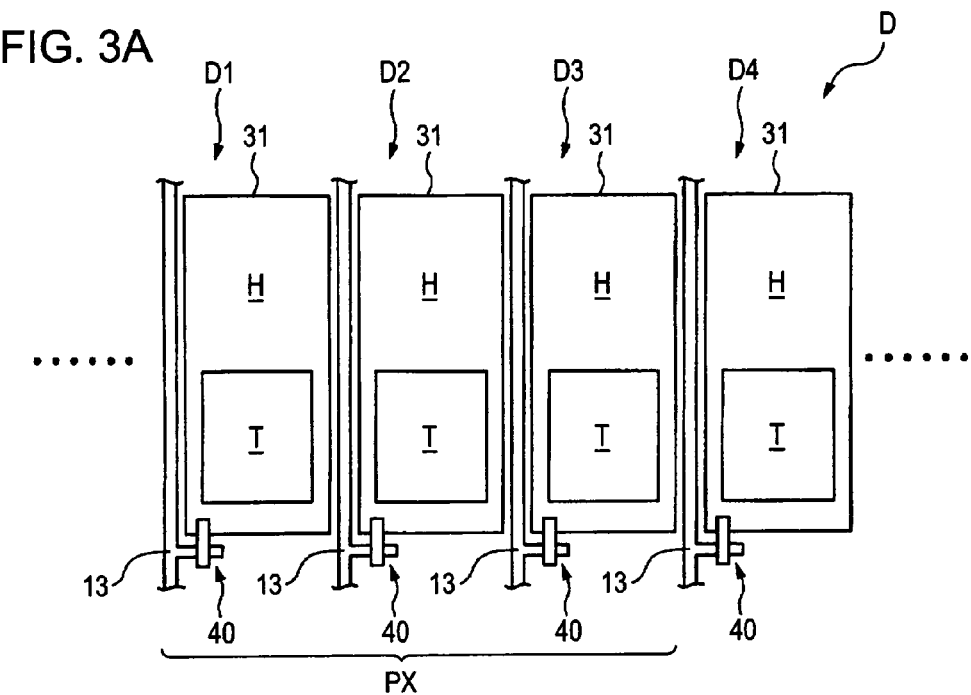
FIG. 3A is a schematic plan view illustrating the pixel structure of the liquid crystal unit according to the first embodiment of the invention.
Figure 3B:
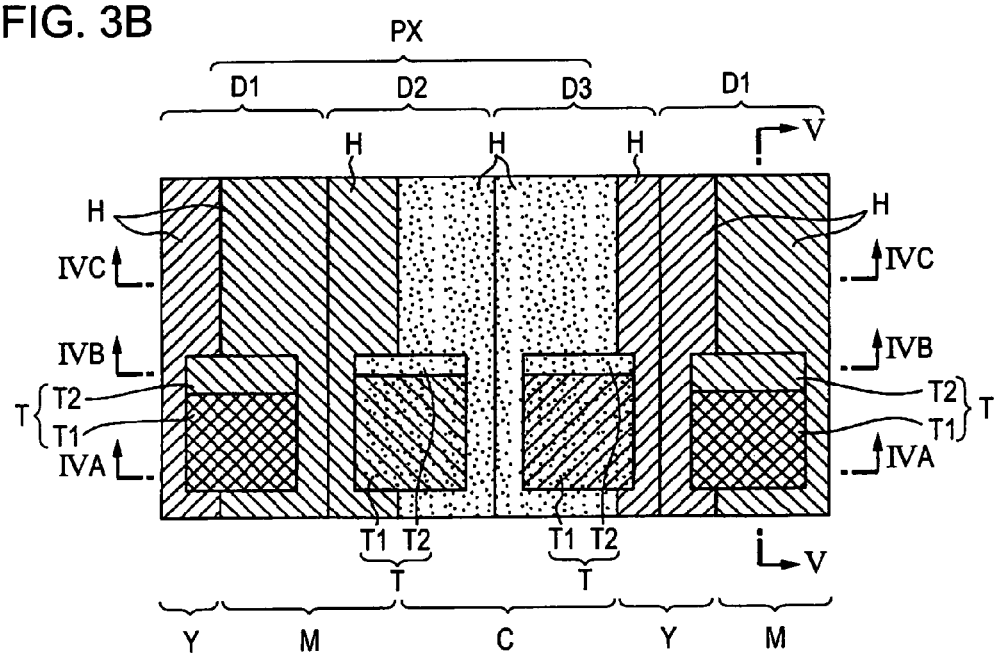
FIG. 3B is another schematic plan view illustrating the pixel structure of the liquid crystal unit according to the first embodiment of the invention.
Figure 4A:
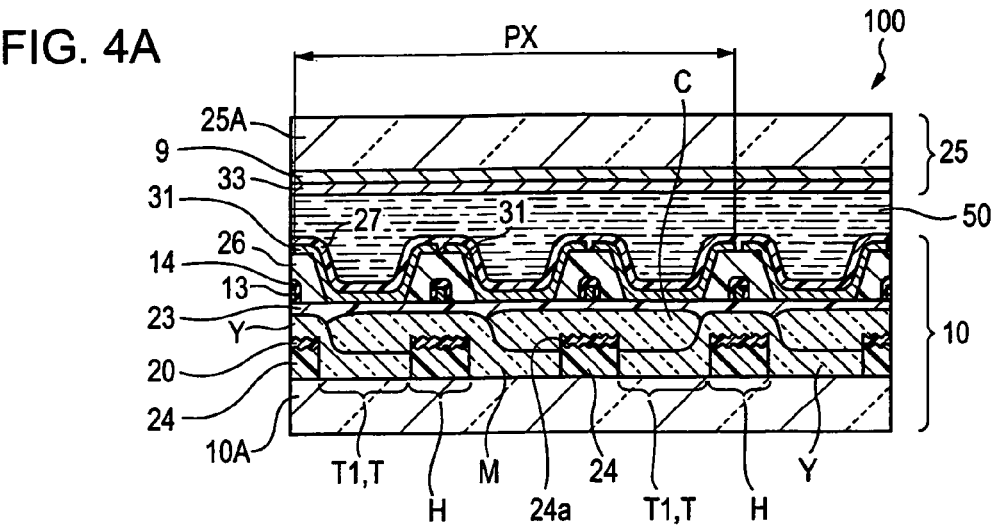
FIG. 4A is a schematic sectional view illustrating the pixel structure of the liquid crystal unit according to the first embodiment of the invention.
Figure 4B:
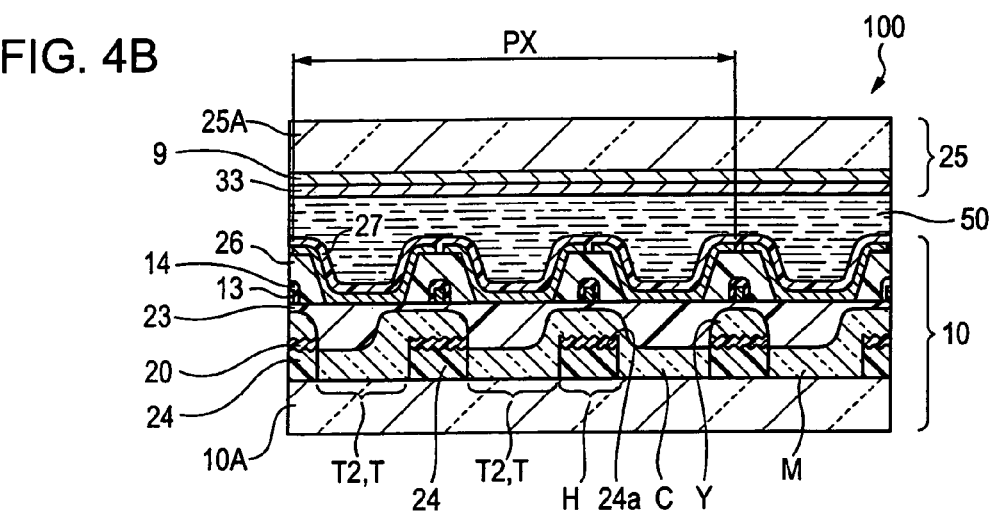
FIG. 4B is another schematic sectional view illustrating the pixel structure of the liquid crystal unit according to the first embodiment of the invention.
Figure 4C:
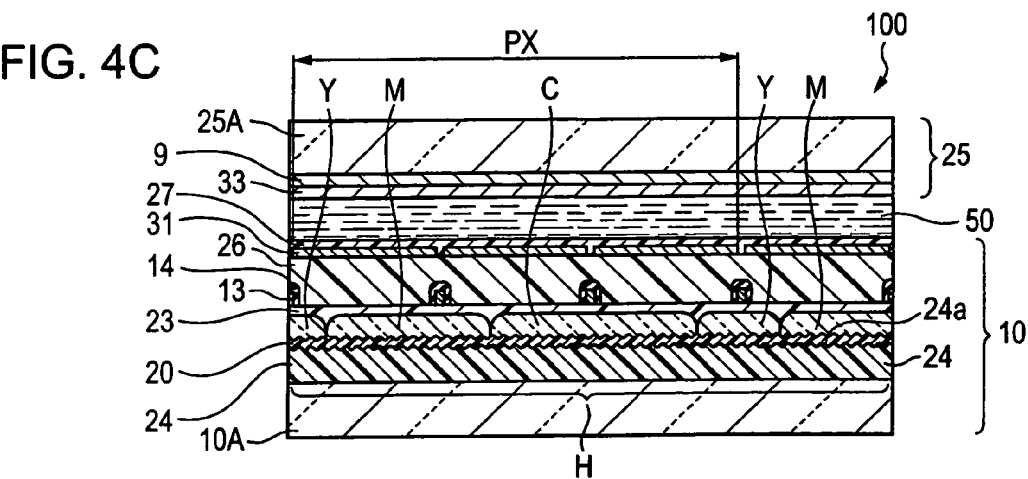
FIG. 4C is another schematic sectional view illustrating the pixel structure of the liquid crystal unit according to the first embodiment of the invention.
Figure 5:
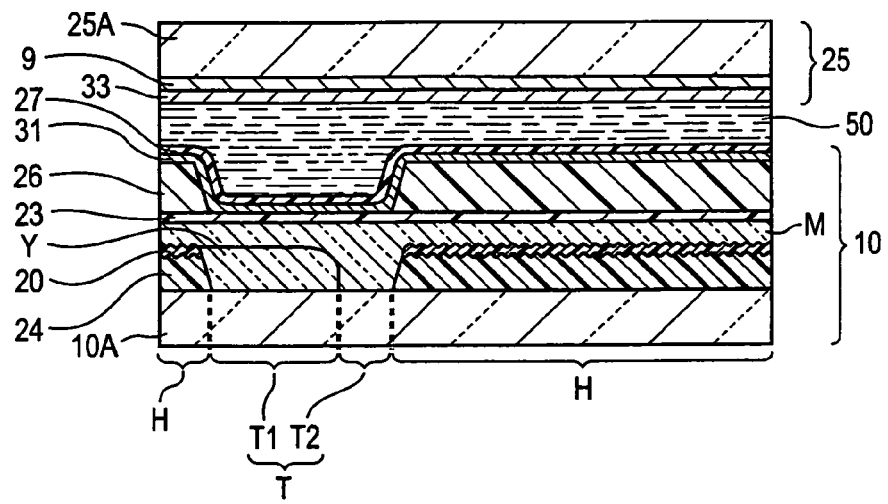
FIG. 5 is another schematic sectional view illustrating the pixel structure of the liquid crystal unit according to the first embodiment of the invention.

The pixel structure of the liquid crystal unit 100 according to this embodiment is then described below with reference to FIGS. 3A and 3B, 4A to 4C, and 5. FIGS. 3A and 3B are diagrams illustrating the pixel structure of the liquid crystal unit 100: FIG. 3A is a schematic plan view of the pixel electrodes 31 in unit pixels; and FIG. 3B is a schematic plan view of color layers in unit pixels. FIGS. 4A to 4C and 5 are diagrams illustrating the sectional structure and pixel structure of the liquid crystal unit 100: FIG. 4A is a schematic sectional view taken along line IVA-IVA in FIG. 3B; FIG. 4B is a schematic sectional view taken along line IVB-IVB in FIG. 3B; FIG. 4C is a schematic sectional view taken along line IVC-IVC in FIG. 3B; and FIG. 5 is a schematic sectional view taken along line V-V in FIG. 3B.

Referring to FIG. 3A, the subpixel regions D are arranged in parallel at a regular pitch in the longitudinal direction of the common electrodes 9 (see FIG. 2). Unit pixels PX each include a series of three adjacent subpixel regions D1, D2, and D3. The unit pixels PX are arranged in a matrix in the liquid crystal unit 100. The three subpixel regions D1, D2, and D3 of each of the unit pixels PX, as described later, macroscopically display red, green, and blue colors which can be gradated according to the voltage applied between the pixel electrodes 31 and the common electrodes 9. The three colors of the unit pixels PX can thus be mixed and gradated to provide full-color display.

The subpixel regions D1, D2, and D3 include the pixel electrodes 31 and the TFDs 40. The pixel electrodes 31 are formed of transparent conductive films such as indium tin oxide (hereinafter abbreviated as ITO) films. In this embodiment, the pixel electrodes 31 have a rectangular planar shape so that the TN liquid crystal can be suitably driven in the plane of the rectangular shape by perpendicularly applying an electric field thereto. The planar shape of the pixel electrodes 31, however, is not limited to the rectangular shape, and an appropriate shape may be used according to the type of liquid crystal used. For example, an alignment member such as protrusions or slits may be provided on the pixel electrodes 31 for vertical alignment (VA) mode, in which vertically aligned liquid crystal molecules having negative dielectric anisotropy are laid down by selectively applying a voltage. Also, a multi-domain structure may be employed, which includes multiple subpixel regions (dots) to separately align liquid crystal molecules. Alternatively, the pixel electrodes 31 may be comb-shaped for in-plane switching (IPS) mode, in which an electric field is horizontally applied.

The TFDs 40 are switching elements connecting the pixel electrodes 31 to the scanning lines 13. The TFDs 40 have a metal-insulator-metal (MIM) structure including a first conductive film mainly containing Ta, an insulating film mainly containing $Ta_2O_3$ which is formed on the first conductive film, and a second conductive film mainly containing Cr which is formed on the insulating film. The first conductive films of the TFDs 40 are connected to the scanning lines 13, and the second conductive films are connected to the pixel electrodes 31. In FIG. 3A, the scanning lines 13 are disposed between the adjacent pixel electrodes 31 and extend in the longitudinal direction of the pixel electrodes 31; actually, the scanning lines 13 are coated with an interlayer insulating film.

The subpixel regions D1, D2, and D3 each include a reflection region H and a transmission region T, which are described below in detail, to provide reflective display with external light and transmissive display with light from a backlight, respectively.

Referring to FIG. 3B, the subpixel regions D1, D2, and D3 include color layers of three colors, namely a cyan color layer C, a yellow color layer Y, and a magenta color layer M, arranged in the longitudinal direction of the common electrode 9 (see FIG. 2). A different combination of two color layers selected from the group of three color layers C, Y, and M are adjacent to each other in the reflection region H and are stacked on top of each other in the transmission region T. In the transmission region T, additionally, one of the two selected color layers has an opening (an opening or cutout portion through which the other of the two color layers is exposed) T2. This opening T2 shows a monochrome portion of the other of the two color layers (an unstacked area where one of the two color layers is formed).

Specifically, the reflection region H and transmission region T of the subpixel region D1 include the color layers Y and M. In the reflection region H, the color layers Y and M are adjacent to each other. The transmission region T has a stacked area T1 where the color layers Y and M are stacked on top of each other and the opening T2, which is formed in the color layer Y. In other words, the opening T2 is formed in the color layer Y to define the monochrome portion of the color layer M. The transmission region T thus includes the stacked area T1 of the color layers Y and M and the monochrome portion of the color layer M.

In addition, the reflection region H and transmission region T of the subpixel region D2 include the color layers M and C. In the reflection region H, the color layers M and C are adjacent to each other. The transmission region T has a stacked area T1 where the color layers M and C are stacked on top of each other and the opening T2, which is formed in the color layer M. In other words, the opening T2 is formed in the color layer M to define the monochrome portion of the color layer C. The transmission region T thus includes the stacked area T1 of the color layers M and C and the monochrome portion of the color layer C.

Furthermore, the reflection region H and transmission region T of the subpixel region D3 include the color layers C and Y. In the reflection region H, the color layers C and Y are adjacent to each other. The transmission region T has a stacked area T1 where the color layers C and Y are stacked on top of each other and the opening T2, which is formed in the color layer Y. In other words, the opening T2 is formed in the color layer Y to define the monochrome portion of the color layer C. The transmission region T thus includes the stacked area T1 of the color layers C and Y and the monochrome portion of the color layer C.

The aperture area of the openings T2 can be adjusted to control the color tones of the transmission regions T of the subpixel regions D1, D2, and D3 and thus control the color tones of the unit pixels PX.

For example, the aperture area of the opening T2 of the subpixel region D1 may be increased to increase the area of the monochrome portion of the color layer M and thus enhance the tone of the color layer M of the transmission region T. Conversely, the aperture area of the opening T2 may be decreased to enhance the tone of the color layer Y of the transmission region T. Accordingly, the opening T2 allows the adjustment of the tone of the transmission region T including the color layers Y and M in the subpixel region D1.

In addition, the aperture area of the opening T2 of the subpixel region D2 may be increased to increase the area of the monochrome portion of the color layer C and thus enhance the tone of the color layer C of the transmission region T. Conversely, the aperture area of the opening T2 may be decreased to enhance the tone of the color layer M of the transmission region T. Accordingly, the opening T2 allows the adjustment of the tone of the transmission region T including the color layers M and C in the subpixel region D2.

Furthermore, the aperture area of the opening T2 of the subpixel region D3 may be increased to increase the area of the monochrome portion of the color layer C and thus enhance the tone of the color layer C of the transmission region T. Conversely, the aperture area of the opening T2 may be decreased to enhance the tone of the color layer Y of the transmission region T. Accordingly, the opening T2 allows the adjustment of the tone of the transmission region T including the color layers Y and C in the subpixel region D3.

Though each of the subpixel regions D1, D2, and D3 has the opening T2 in this embodiment, the opening T2 does not necessarily have to be provided in every subpixel region; the opening T2 may be provided in at least one of the subpixel regions D1, D2, and D3 in the unit pixels PX.

The color layers C, Y, and M are disposed across the boundaries between the subpixel regions D1, D2, and D3. Specifically, the color layer M is disposed across the boundary between the subpixel regions D1 and D2. The color layer C is disposed across the boundary between the subpixel regions D2 and D3. The color layer Y is disposed across the boundary between the subpixel regions D1 and D3. In other words, the color layers C, Y, and M are disposed across the scanning lines 13, which are provided between the subpixel regions D1, D2, and D3, as is obvious from a comparison between FIGS. 3A and 3B.

The two color layers formed in the reflection region H of each subpixel region D have different surface areas. In other words, the reflection region H includes two color layers with different areas. The two color layers with different areas allow the adjustment of the color tones of the reflection regions H of the subpixel regions D1, D2, and D3 and those of the unit pixels PX.

For example, the surface area of the color layer M of the subpixel region D1 may be increased relative to that of the color layer Y to enhance the tone of the color layer M of the reflection region H. Conversely, the surface area of the color layer Y of the subpixel region D1 may be increased relative to that of the color layer M to enhance the tone of the color layer Y of the reflection region H. This allows the adjustment of the tone of the reflection region H including the color layers Y and M in the subpixel region D1.

In addition, the surface area of the color layer C of the subpixel region D2 may be increased relative to that of the color layer M to enhance the tone of the color layer C of the reflection region H. Conversely, the surface area of the color layer M of the subpixel region D2 may be increased relative to that of the color layer C to enhance the tone of the color layer M of the reflection region H. This allows the adjustment of the tone of the reflection region H including the color layers M and C in the subpixel region D2.

Furthermore, the surface area of the color layer C of the subpixel region D3 may be increased relative to that of the color layer Y to enhance the tone of the color layer C of the reflection region H. Conversely, the surface area of the color layer Y of the subpixel region D3 may be increased relative to that of the color layer C to enhance the tone of the color layer Y of the reflection region H. This allows the adjustment of the tone of the reflection region H including the color layers Y and C in the subpixel region D3.

In the reflection region H of the subpixel region D1, the color layer M has a larger surface area than the color layer Y in this embodiment. In the reflection region H of the subpixel region D2, the color layer C has a larger surface area than the color layer M in this embodiment. In the reflection region H of the subpixel region D3, the color layer C has a larger surface area than the color layer Y in this embodiment.

Though the reflection region H of each of the subpixel regions D1, D2, and D3 includes color layers with different surface areas in this embodiment, the color layers do not necessarily have to have different surface areas in every subpixel region; color layers with different surface areas may be provided in the reflection region H of at least one of the subpixel regions D1, D2, and D3 in the unit pixels PX.

In each of the unit pixels PX, the color layer Y has the smallest surface area among the color layers C, Y, and M in the reflection regions H and in the stacked areas T1 of the transmission regions T.

The sectional structure of the unit pixels PX is then described below with reference to FIGS. 4A to 4C and 5. FIG. 4A is a sectional view of the stacked areas T1 of the transmission regions T. FIG. 4B is a sectional view of the openings T2 of the transmission regions T. FIG. 4C is a sectional view of the reflection regions H. In FIGS. 4A to 4C and 5, the liquid crystal unit 100 according to this embodiment mainly includes an upper section 25, a lower section (color filter substrate) 10 opposite the upper section 25, and a liquid crystal layer 50 disposed between the two sections 25 and 10.

The lower section 10 includes, from bottom to top, a bottom substrate (transparent member) 10A, the color layers C, Y, and M, a thickness-adjusting portion 24 for adjusting the thickness of the color layers C, Y, and M, a reflective film (reflective member) 20, a planarizing layer 23, the scanning lines 13, insulating layers 14, a thickness-adjusting portion 26 for adjusting the thickness of the liquid crystal layer 50, the pixel electrodes 31, and an alignment film 27.

The bottom substrate 10A, which serves as the base for the lower section 10, is formed of a transparent material such as quartz or glass; in general, the bottom substrate 10A is cut from a large substrate called a mother glass.

The color layers C, Y, and M provide cyan, yellow, and magenta colors, respectively, for external light entering the liquid crystal unit 100 from the viewer side and light emitted from a backlight which enters the liquid crystal unit 100 from the opposite side. These color layers C, Y, and M transmit visible light in predetermined wavelength regions of the visible wavelength distribution (spectral characteristics) of the light entering the color layers C, Y, and M. In other words, the color layers C, Y, and M have predetermined transmission characteristics to transmit visible light. The color layers C, Y, and M thus transmit visible light in the cyan, yellow, and magenta wavelength regions, respectively.

To provide a full-color transflective liquid crystal unit, the tones of the color layers C, Y, and M in the transmission region T and the reflection region H must be adjusted because the materials for the color layers C, Y, and M do not have ideal intrinsic wavelength regions. As described above, therefore, the transmission regions T are separated into the stacked areas T1 and the openings T2 to form monochrome portions and mixed-color portions, thereby adjusting the tones of the color layers C, Y, and M in the transmission regions T. On the other hand, two color layers with different surface areas are provided in the reflection regions H to allow the adjustment of the tones thereof.

The color layers C, Y, and M may be formed by, for example, photolithography. Specifically, a color layer is formed over the top surface of the bottom substrate 10, and a resist layer having openings is formed on the color layer to selectively remove portions of the color layer which are exposed through the openings. This process may be carried out for each of the color layers C, Y, and M to pattern the color layers C, Y, and M. Use of photosensitive color layers eliminates the need for the use of a resist for selectively removing the color layers to simplify the photolithography process. The method for forming the color layers C, Y, and M is not limited to photolithography; for example, inkjetting (droplet ejection) may be used. In inkjetting, the liquid materials for the color layers C, Y, and M are applied to the substrate 10A in a predetermined pattern using a discharge head filled with the liquid materials and are dried and solidified to form solid color layers.

The thickness-adjusting portion 24 is formed on part of the surface of the bottom substrate 10A opposite the liquid crystal layer 50. The reflective film 20, which is formed of a metal with high reflectance, such as aluminum or silver, is disposed on the surface of the thickness-adjusting portion 24. The region where the reflective film 20 is formed corresponds to the reflection regions H, and the regions where the reflective film 20 is not formed, namely openings 21 in the reflective film 20, correspond to the transmission regions T. The thickness-adjusting portion 24 has an irregular surface 24a which forms irregularities on the surface of the reflective film 20. These irregularities scatter light reflected by the reflective film 20 to prevent glare due to external light so that the liquid crystal unit 100 can provide reflective display over a wide range of viewing angles.

The thickness-adjusting portion 24 is disposed between the bottom substrate 10A and the color layers C, Y, and M in the reflection regions H to adjust the thicknesses of the color layers C, Y, and M in the reflection regions H and the transmission regions T. Because the thickness-adjusting portion 24 is provided, as shown in FIG. 4A, the thickness of the stacked areas T1 of the transmission regions T is about twice that of the color layers C, Y, and M in the reflection regions H. Accordingly, the total optical path length of external light passing through the color layers C, Y, and M and reflected in the reflection regions H is substantially equivalent to the total optical path length of light from a backlight which passes through the transmission regions T. This structure can reduce the difference in color tone due to the difference in optical path length between the reflection regions H and the transmission regions T to provide similar color tones.

Unless the thickness-adjusting portion 24 is provided, steps are formed between the stacked areas T1 of the transmission regions T and the reflection regions H. The stepped areas can be lifted by the thickness-adjusting portion 24 so that the color layers C, Y, and M can have the same height from the bottom substrate 10A in the stacked areas T1 of the transmission regions T and in the reflection regions H.

The thickness-adjusting portion 24 is formed by, for example, patterning a resin resist using photolithography. The irregular surface 24a can be formed by applying another resin to the patterned resin resist. Alternatively, the shape of the surface 24a may be adjusted by heat-treating the patterned resin resist, or the irregular surface 24a may be formed by exposure using a tone mask with different amounts of exposure.

The planarizing layer 23 is formed on the color layers C, Y, and M to form a flat surface over the color layers C, Y, and M. The material used for the planarizing layer 23 is, for example, an organic film such as an acrylic film. The planarizing layer 23 is formed by a wet process, such as spin coating, to form a flat surface more suitably so that it can smoothly cover irregularities in the areas where the openings T2 are formed and on the top color layers C, Y, and M in the transmission regions T and the reflection regions H, thus providing a more significant planarizing effect. In this embodiment, steps are formed between the areas where the openings T2 are formed and the area where the openings T2 are not formed; the areas where the openings T2 are formed can be filled with the planarizing layer 23 to provide a flat surface over the transmission regions T. In addition, the planarizing layer 23 can complementarily reduce variations in the thickness and flatness of the color layers C, Y, and M, which cannot be inhibited only with the thickness-adjusting portion 24, to form a flat surface.

The scanning lines 13 are connected to the pixel electrodes 31 through the TFDs 40, as shown in FIG. 3A. The insulating layers 14 are formed on the scanning lines 13 to enhance the insulation between the scanning lines 13 and the pixel electrodes 31.

The thickness-adjusting portion 26 for adjusting the thickness of the liquid crystal layer 50 is disposed in the area corresponding to the reflection regions H. The thickness-adjusting portion 26 is selectively formed above the reflective film 20 with the color layers C, Y, and M disposed therebetween so that the liquid crystal layer 50 has different thicknesses in the reflection regions H and the transmission regions T. The thickness-adjusting portion 26 is formed of, for example, an organic film such as an acrylic film, and is sloped in the vicinity of the boundaries between the reflection regions H and the transmission regions T so that the thickness of the thickness-adjusting portion 26 changes continuously. The liquid crystal layer 50 has a thickness of about 1 to 5 µm in the areas where the thickness-adjusting portion 26 is not formed, and the thickness of the liquid crystal layer 50 in the reflection regions H is about half that in the transmission regions T. The liquid crystal unit 100 can therefore cause substantially equal retardation for reflective display and transmissive display to enhance contrast. The thickness-adjusting portion 26 is gently sloped between the reflection regions H and the transmission regions T to form the overlying layers into the shape of the slope.

The pixel electrodes 31 are formed on the thickness-adjusting portion 26. In FIGS. 4A to 4C, the pixel electrodes 31 extend perpendicularly to the page, and the surfaces thereof face the common electrodes 9. The alignment film 27 is disposed on the pixel electrodes 31 and is formed of, for example, a resin such as polyimide. The top surface of the alignment film 27 is subjected to rubbing or vertical alignment treatment according to the mode of liquid crystal molecules; for example, rubbing is performed for liquid crystal molecules in TN or super twisted nematic (STN) mode, and vertical alignment treatment is performed for liquid crystal molecules having negative dielectric anisotropy in VA mode. If the alignment film 27 is formed of a vertical alignment film, an inorganic film may be used instead of a polyimide film.

The upper section 25 includes, from top to bottom, a top substrate 25A, the common electrodes 9, and an alignment film 33. The common electrodes 9, as well as the pixel electrodes 31, are formed of ITO. In FIGS. 4A to 4C, the common electrodes 9 extend in the lateral direction of the page, and the surfaces thereof face the pixel electrodes 31. The alignment film 33 is disposed on the common electrodes 9 and is formed of, for example, a resin such as polyimide. The bottom surface of the alignment film 33 is subjected to rubbing or vertical alignment treatment according to the mode of liquid crystal molecules; for example, rubbing is performed for liquid crystal molecules in TN, STN, or IPS mode, and vertical alignment treatment is performed for liquid crystal molecules having negative dielectric anisotropy in VA mode. If the alignment film 33 is formed of a vertical alignment film, an inorganic film may be used instead of a polyimide film.

The liquid crystal layer 50 is held between the pixel electrodes 31 and the common electrodes 9. The state of liquid crystal molecules changes according to the magnitude of voltage applied between the electrodes 31 and 9 to provide predetermined optical characteristics. The mode of material for the liquid crystal layer 50 is, for example, TN, STN, VA, or IPS mode.

A backlight is provided outside the lower section 10 of the liquid crystal unit 100. This backlight emits light that passes through the transmission regions T and exits from the upper section 25. The liquid crystal unit 100 according to this embodiment further includes, for example, a retardation film and a polarizing plate disposed in predetermined orientations according to the type of liquid crystal layer 50 used (i.e., the mode of operation, such as TN mode, STN mode, VA mode, or IPS mode, and whether normally white mode or normally black mode is employed), though they are not illustrated in the drawings.

Light entering the liquid crystal unit 100 from the viewer side (from the upper section 25 side) passes through two of the color layers C, Y, and M to reach the reflective film 20, which then reflects the light to the viewer side. When viewed microscopically, the two color layers in the reflection region H of each subpixel region D are not stacked on top of each other; when viewed macroscopically, however, the reflected light passing through the two color layers has a mixture of the two colors. In the reflection region H of the subpixel region D1, the color layers Y and M transmit display light of red, which is a mixture of yellow and magenta. In the reflection region H of the subpixel region D2, the color layers M and C transmit display light of blue, which is a mixture of magenta and cyan. In the reflection region H of the subpixel region D3, the color layers C and Y transmit display light of green, which is a mixture of cyan and yellow. In addition, the reflection regions H include color layers with different surface areas to suitably adjust the tones of red, green, and blue.

On the other hand, the backlight of the liquid crystal unit 100 is turned on to emit light which passes through the bottom substrate 10A and the color layers in the stacked area T1 of the transmission region T to exit to the viewer side. The stacked area T1 therefore transmits display light of a mixture of the two colors. The light from the backlight also passes through the bottom substrate 10A and the color layer in the opening T2 of the transmission region T to exit to the viewer side. The opening T2 therefore transmits display light of one of the two colors. Accordingly, the transmission region T simultaneously transmits the mixed color light passing through the stacked area T1 and the monochrome light passing through the opening T2. In the transmission region T of the subpixel region D1, the color layers Y and M transmit display light of red, which is a mixture of yellow and magenta. In the transmission region T of the subpixel region D2, the color layers M and C transmit display light of blue, which is a mixture of magenta and cyan. In the transmission region T of the subpixel region D3, the color layers C and Y transmit display light of green, which is a mixture of cyan and yellow. The transmission regions T thus include the openings T2 and the stacked areas T1 to suitably adjust the tones of red, green, and blue.

As described above, the color tones of the transmission regions T and the reflection regions H can be adjusted so that the individual subpixel regions D1, D2, and D3, which constitute the unit pixels PX, can provide red, blue, and green display colors with suitably adjusted tones to achieve a full-color display with a better white balance. In addition, the aperture areas of the openings T2 or the surface areas of the color layers in the reflection regions H can be adjusted to control the balance between the mixed colors and the single colors. This increases the flexibility of color design.

The color layers C, Y, and M are formed across the boundaries between the adjacent subpixel regions so that the color layers C, Y, and M alone can constitute the reflection regions H and the transmission regions T of the subpixel regions. A first color layer and a second color layer are formed on both sides of each subpixel across the boundaries between the adjacent subpixels to constitute the reflection regions H and the transmission regions T of the subpixels.

The thickness-adjusting portion 24 is disposed between the bottom substrate 10A and the color layers C, Y, and M in the reflection regions H to adjust the thicknesses of the color layers C, Y, and M in the reflection regions H and the transmission regions T. Accordingly, the total optical path length of external light passing through the color layers C, Y, and M and reflected in the reflection regions H is substantially equivalent to the total optical path length of light from the backlight which passes through the transmission regions T. This structure can reduce the difference in color tone due to the difference in optical path length between the reflection regions H and the transmission regions T to provide similar color tones. In addition, the thickness-adjusting portion 24 lifts the color layers C, Y, and M in the reflection regions H so that they can have the same height from the bottom substrate 10A in the transmission regions T and the reflection regions H.

The areas where the openings T2 are formed can be filled with the planarizing layer 23 to provide a flat surface over the transmission regions T. In addition, the planarizing layer 23 can complementarily reduce variations in the thickness and flatness of the color layers C, Y, and M, which cannot be inhibited only with the thickness-adjusting portion 24, to form a flat surface.

The color, layer Y has the smallest surface area among the color layers C, Y, and M in the reflection regions H and the transmission regions T to achieve a better white balance. Specifically, the inventors have confirmed that a unit pixel PX in which the color layer Y has the largest surface area among the color layers C, Y, and M cannot achieve a suitable white balance because the color triangle of the unit pixel PX tends to show an uneven distribution on the yellow side. The uneven distribution can be avoided by minimizing the area of the color layer Y to achieve a color triangle with a suitable white balance.

Second Embodiment

A liquid crystal unit according to a second embodiment of the invention is described below with reference to FIG. 6. In this embodiment, only differences from the first embodiment are described, and like members are indicated by the same reference numerals to omit detailed descriptions thereof.

Figure 6:
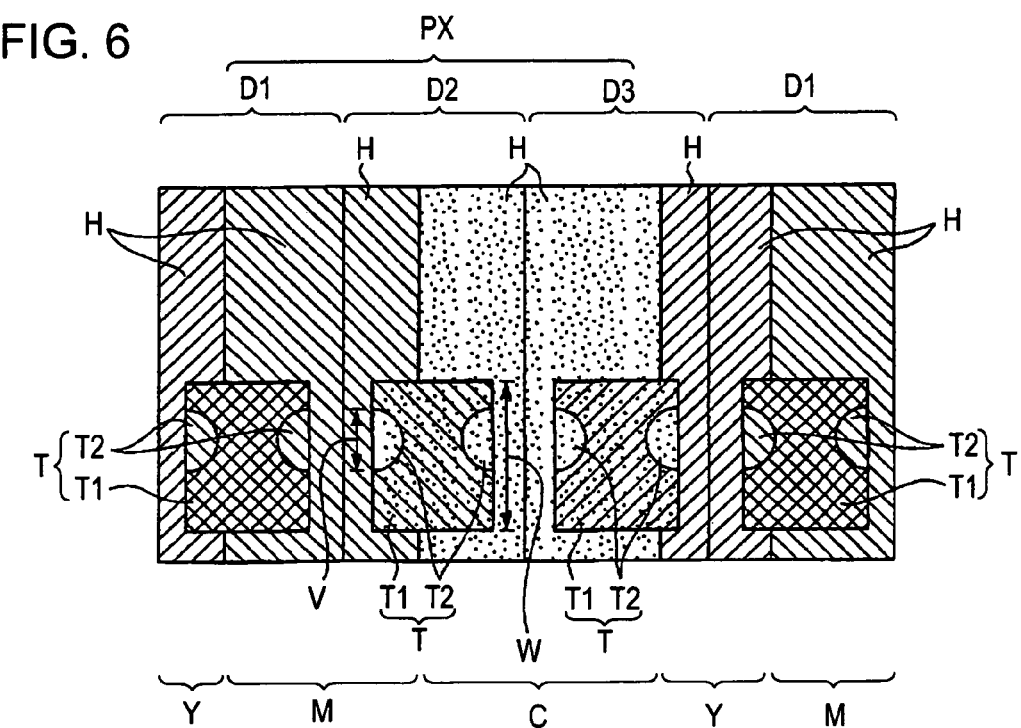
FIG. 6 is a schematic plan view illustrating the pixel structure of a liquid crystal unit according to a second embodiment of the invention.

FIG. 6 is a schematic plan view of color layers in the unit pixels of the liquid crystal unit according to this embodiment. In FIG. 6, each unit pixel PX includes the subpixel regions D1, D2, and D3, each including the reflection region H and the transmission region T. In this embodiment, the openings T2 are provided on both sides of the transmission region T, that is, on the sides of the transmission region T in the lateral direction of the subpixel regions D1, D2, and D3 (in the lateral direction of the page). The openings T2 are formed in a semicircular shape on both sides of the transmission region T. The diameter V of the semicircular shape is smaller than the length W of the sides of the transmission regions T. Accordingly, only the color layer M is formed in the openings T2 in the subpixel region D1, and only the color layer C is formed in the openings T2 in the subpixel regions D2 and D3.

In the patterning of the color layers C, Y, and M, the alignment of a photomask may deviate in the lateral direction of the subpixel regions D1, D2, and D3. In that case, according to this embodiment, the area of the opening T2 on one side increases while the area of the opening T2 on the other side decreases, and the increase in aperture area is equal to the decrease in aperture area; that is, the aperture area does not change even if the alignment deviates. This structure can therefore tolerate the deviation of alignment of a photomask, and thus causes no deviation in the balance between the mixed color and the single color of the transmission region T due to variations in aperture area. Accordingly, the openings T2 can stabilize the balance between the mixed color and the single color of the transmission region T to stabilize the tones and white balance of the color layers C, Y, and M.

Modification of Second Embodiment

Figure 7:
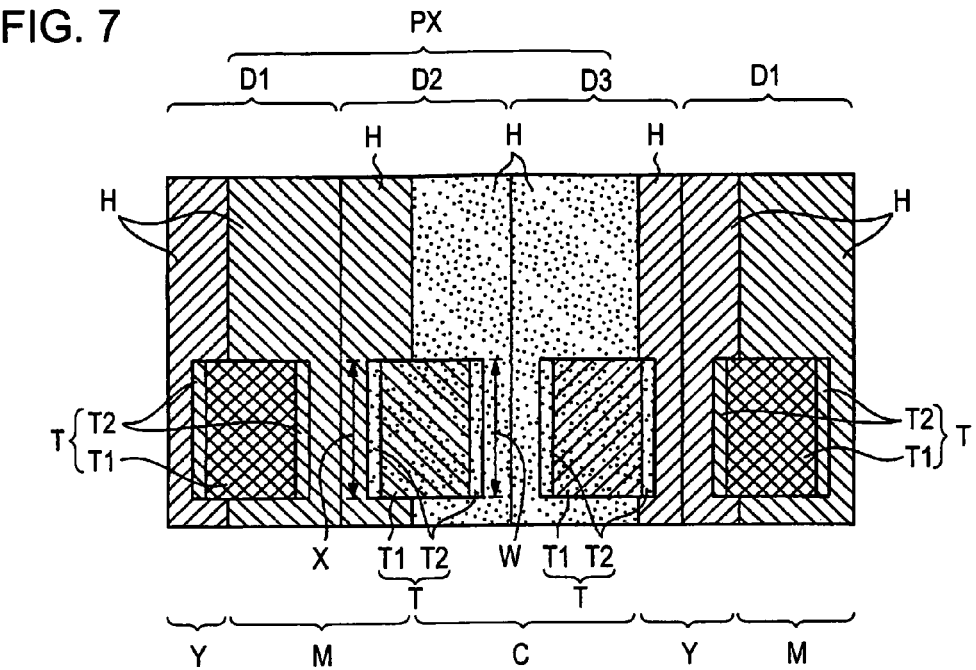
FIG. 7 is a schematic plan view illustrating the pixel structure of a liquid crystal unit according to a modification of the second embodiment of the invention.

A liquid crystal unit according to a modification of the second embodiment of the invention is described below with reference to FIG. 7. FIG. 7 is a schematic plan view of color layers in the unit pixels of the liquid crystal unit according to this modification. In FIG. 7, each unit pixel PX includes the subpixel regions D1, D2, and D3, each including the reflection region H and the transmission region T. In this modification, as in the second embodiment, the openings T2 are provided on both sides of the transmission region T. The openings T2 are formed in a rectangular shape on both sides of the transmission region T. The length X of the rectangular shape in the longitudinal direction of the transmission region T is smaller than the length W of the transmission region T. Accordingly, only the color layer M is formed in the openings T2 in the subpixel region D1, and only the color layer C is formed in the openings T2 in the subpixel regions D2 and D3.

In the patterning of the color layers C, Y, and M, as described above, the alignment of a photomask may deviate in the lateral direction of the subpixel regions D1, D2, and D3. In that case, as in the second embodiment, the area of the opening T2 on one side increases while the area of the opening T2 on the other side decreases, and the increase in aperture area is equal to the decrease in aperture area; that is, the aperture area does not change even if the alignment deviates. This structure can therefore tolerate the deviation of alignment of a photomask, and thus causes no deviation in the balance between the mixed color and the single color in the transmission region T due to variations in aperture area. Accordingly, the openings T2 can stabilize the balance between the mixed color and the single color of the transmission region T to stabilize the tones and white balance of the color layers C, Y, and M.

Though the second embodiment shown in FIG. 6 and its modification shown in FIG. 7 have similar advantages, the shape of the openings T2 in the transmission regions T in FIG. 6 is preferred to that in FIG. 7. Specifically, the length of the openings T2 formed on both sides of the transmission regions T is preferably smaller than the length W of the sides of the transmission regions T. If the openings T2 are formed over the length of the sides of the transmission regions T, that is, X=W, as shown in FIG. 7, the total aperture area of the openings T2 does not change after the deviation of the alignment of a photomask, but the cancelled amounts of increase and decrease in aperture area increase. If, on the other hand, cutout portions (the semicircular openings T2) are formed, that is, the length of the openings T2 is smaller than the length W of the sides of the transmission regions T (V<W), as shown in FIG. 6, the total aperture area of the openings T2 does not change after the deviation of the alignment of a photomask, and the cancelled amounts of increase and decrease in aperture area can be smaller than those in the above case.

Third Embodiment

A liquid crystal unit according to a third embodiment of the invention is described below with reference to FIG. 8. In this embodiment, only differences from the first embodiment are described, and like members are indicated by the same reference numerals to omit detailed descriptions thereof.

Figure 8:
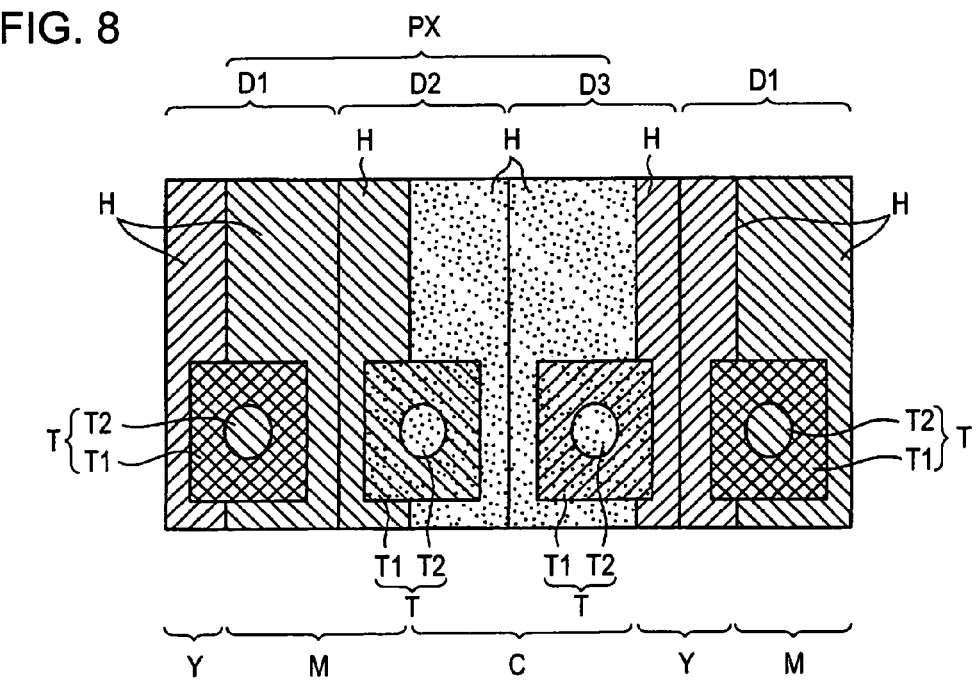
FIG. 8 is a schematic plan view illustrating the pixel structure of a liquid crystal unit according to a third embodiment of the invention.

FIG. 8 is a schematic plan view of color layers in the unit pixels of the liquid crystal unit according to this embodiment. In FIG. 8, each unit pixel PX includes the subpixel regions D1, D2, and D3, each including the reflection region H and the transmission region T. In this embodiment, the opening T2 is provided in the center of the transmission region T. Accordingly, only the color layer M is formed in the opening T2 in the subpixel region D1, and only the color layer C is formed in the openings T2 in the subpixel regions D2 and D3. This structure has the similar advantages as in the first embodiment.

Fourth Embodiment

A fourth embodiment is described below with reference to the drawings. While the color filters according to the above embodiments have color layers of three colors, a color filter according to the fourth embodiment has color layers of four colors. In this embodiment, only differences from the above embodiments are described, and like members are indicated by the same reference numerals to omit detailed descriptions thereof.

Figure 9:
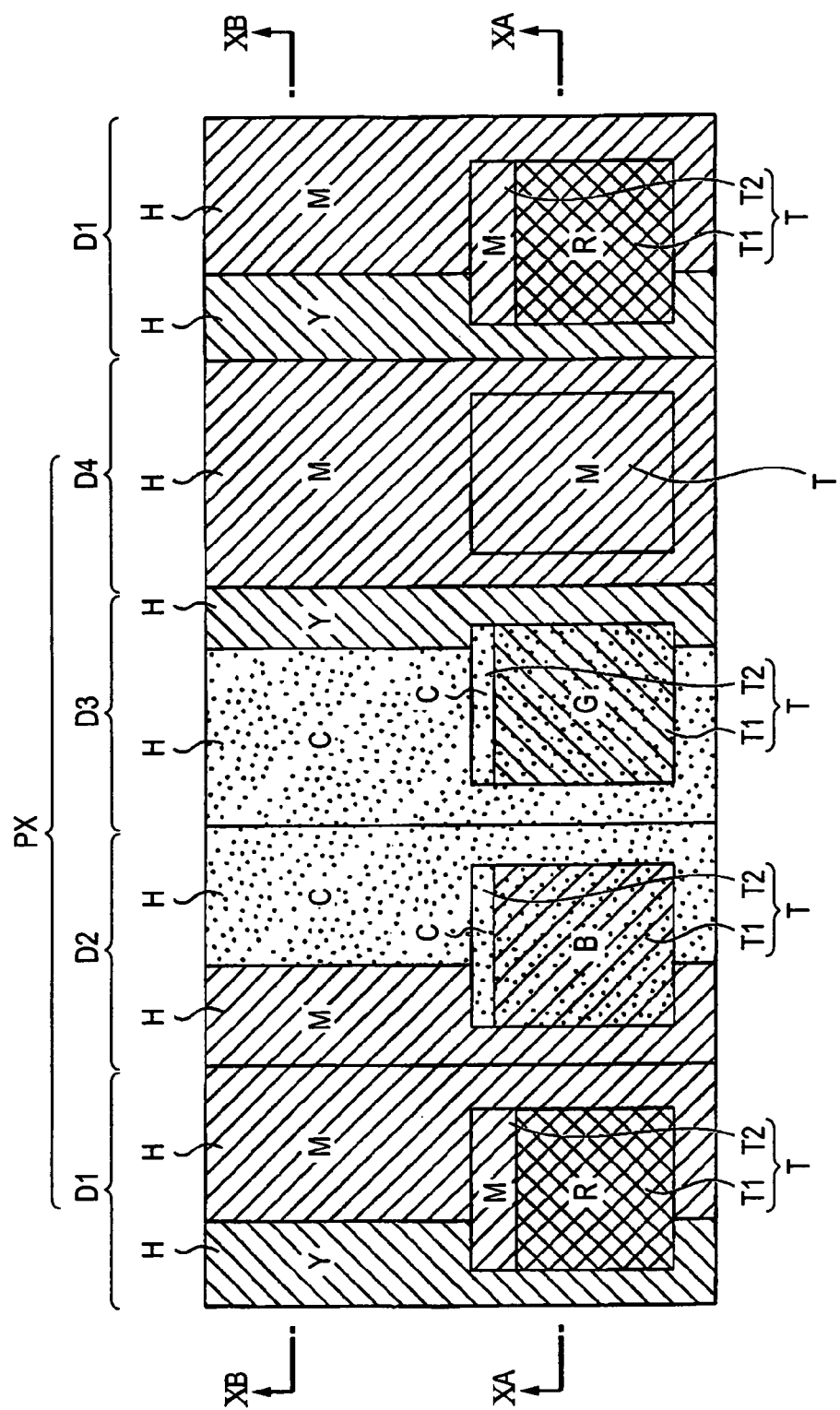
FIG. 9 is a schematic plan view illustrating the pixel structure of a liquid crystal unit according to a fourth embodiment of the invention.
Figure 10A:
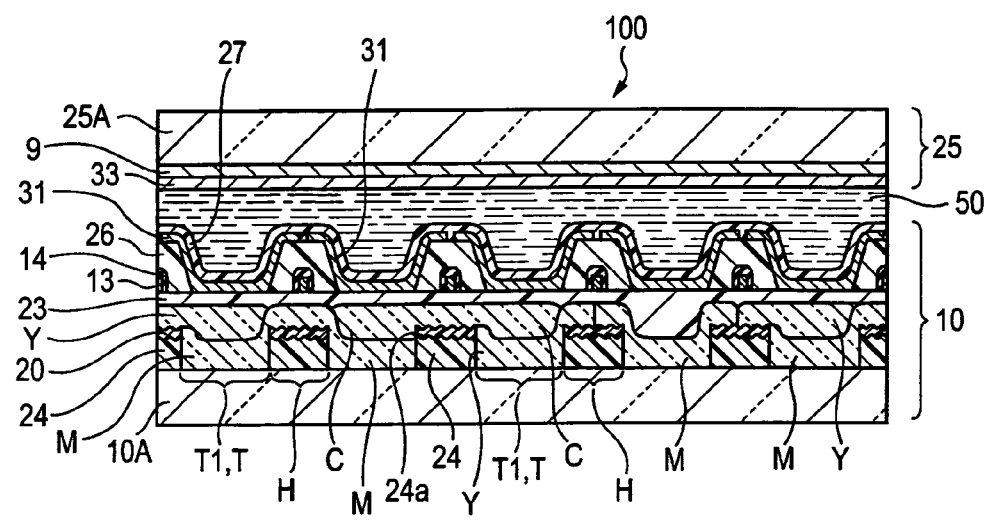
FIG. 10A is a schematic sectional view illustrating the pixel structure of a liquid crystal unit according to the fourth embodiment of the invention.
Figure 10B:
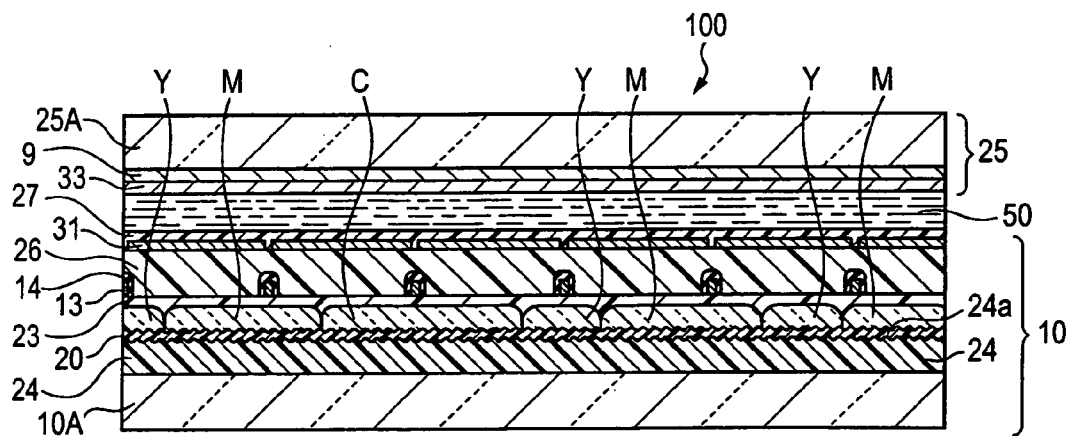
FIG. 10B is another schematic sectional view illustrating the pixel structure of the liquid crystal unit according to the fourth embodiment of the invention.

The pixel structure of a liquid crystal unit 100 according to this embodiment is described below with reference to FIGS. 9, 10A, and 10B. FIG. 9 is a plan view of color layers in the unit pixels of the liquid crystal unit. FIG. 10A is a sectional view taken along line XA-XA in FIG. 9. FIG. 10B is a sectional view taken along line XB-XB in FIG. 9.

Referring to FIG. 9, each unit pixel PX of the liquid crystal unit includes four subpixel regions (dot regions) D1, D2, D3, and D4. The subpixel region D1 includes color layers corresponding to red. The subpixel region D2 includes color layers corresponding to blue. The subpixel region D3 includes color layers corresponding to green. The subpixel region D4 includes the magenta color layer M. That is, the color filter of the liquid crystal unit 100 according to this embodiment includes color layers corresponding to four colors. The color layer M may be replaced with the color layer C (cyan is the complementary color of red) or the color layer Y.

In FIG. 9, the subpixel regions D1, D2, D3, and D4 each include the reflection region H and the transmission region T to provide reflective display with external light and transmissive display with light from a backlight, respectively. A different combination of two color layers selected from the group of three color layers C, Y, and M are adjacent to each other in a plane in the reflection region H, as shown in FIG. 9, and are stacked on top of each other (bilayer structure) in the transmission region T, as shown in FIG. 10A. In addition, the transmission region T has the opening (an opening or cutout portion through which one of the two color layers is exposed) T2. The opening T2 shows an unstacked area where one of the two color layers is formed. Of the subpixel regions D1, D2, D3, and D4, the subpixel region D4 includes a single color layer so as not to display the same color as the other subpixel regions.

The structures of the subpixel regions D1, D2, D3, and D4 are described below in detail. The subpixel region D1 includes the color layers Y and M to transmit yellow light and magenta light which are mixed into red light. In FIGS. 9 and 10B, the color layers Y and M are adjacent to each other in a plane in the reflection region H of the subpixel region D1. In FIGS. 9 and 10A, the transmission region T has the stacked area T1, where the color layers Y and M are stacked on top of each other, and the opening T2, which is formed in the stacked area T1. The color layer M is exposed through the cut portion of the color layer Y; that is, only the color layer M is disposed in the opening T2.

The subpixel region D2 includes the color layers C and M to transmit cyan light and magenta light which are mixed into blue light. In FIGS. 9 and 10B, the color layers C and M are adjacent to each other in a plane in the reflection region H of the subpixel region D2. In FIGS. 9 and 10A, the transmission region T has the stacked area T1, where the color layers C and M are stacked on top of each other, and the opening T2, which is formed in the stacked area T1. The color layer C extends over the cut portion of the color layer M (the underlying layer); that is, only the color layer C is disposed in the opening T2.

The subpixel region D3 includes the color layers C and Y to transmit cyan light and yellow light which are mixed into green light. In FIGS. 9 and 10B, the color layers C and Y are adjacent to each other in a plane in the reflection region H of the subpixel region D3. In FIGS. 9 and 10A, the transmission region T has the stacked area T1, where the color layers C and Y are stacked on top of each other, and the opening T2, which is formed in the stacked area T1. The color layer C extends over the cut portion of the color layer Y; that is, only the color layer C is disposed in the opening T2.

The subpixel region D4 includes only the color layer M to transmit magenta light. In this embodiment, two of the group of three colors, namely cyan, yellow, and magenta, are mixed to obtain each of the primary colors, namely red, green, and blue; therefore, any one of the four subpixel regions D1, D2, D3, and D4 must be monochrome so that color layers corresponding to four colors can be provided. In FIGS. 9, 10A, and 10B, specifically, the transmission region T of the subpixel region D4 includes only the color layer M, unlike the subpixel regions D1, D2, and D3, where two color layers are stacked on top of each other. Also, the reflection region H of the subpixel region D4 includes only the same single color layer as the transmission region T, unlike the subpixel regions D1, D2, and D3, where two color layers are adjacent to each other in a plane. That is, the overall subpixel region D4 is covered with the single color layer M.

According to this embodiment, a color filter having color layers of four colors can be provided by forming the subpixel regions D1, D2, and D3, which display the primary colors, namely red, green, and blue, and the subpixel region D4, which displays a color other than the three colors. This color filter enables a larger range of color reproduction to provide a liquid crystal unit with higher resolution and a wider color range.

Fifth Embodiment

A fifth embodiment is described below with reference to the drawings. While the color filters according to the above embodiments, have color layers of three or four colors, a color filter according to the fifth embodiment has color layers of five colors. In this embodiment, only differences from the above embodiments are described, and like members are indicated by the same reference numerals to omit detailed descriptions thereof.

The pixel structure of a liquid crystal unit 100 according to this embodiment is described below with reference to FIGS.

Figure 11:
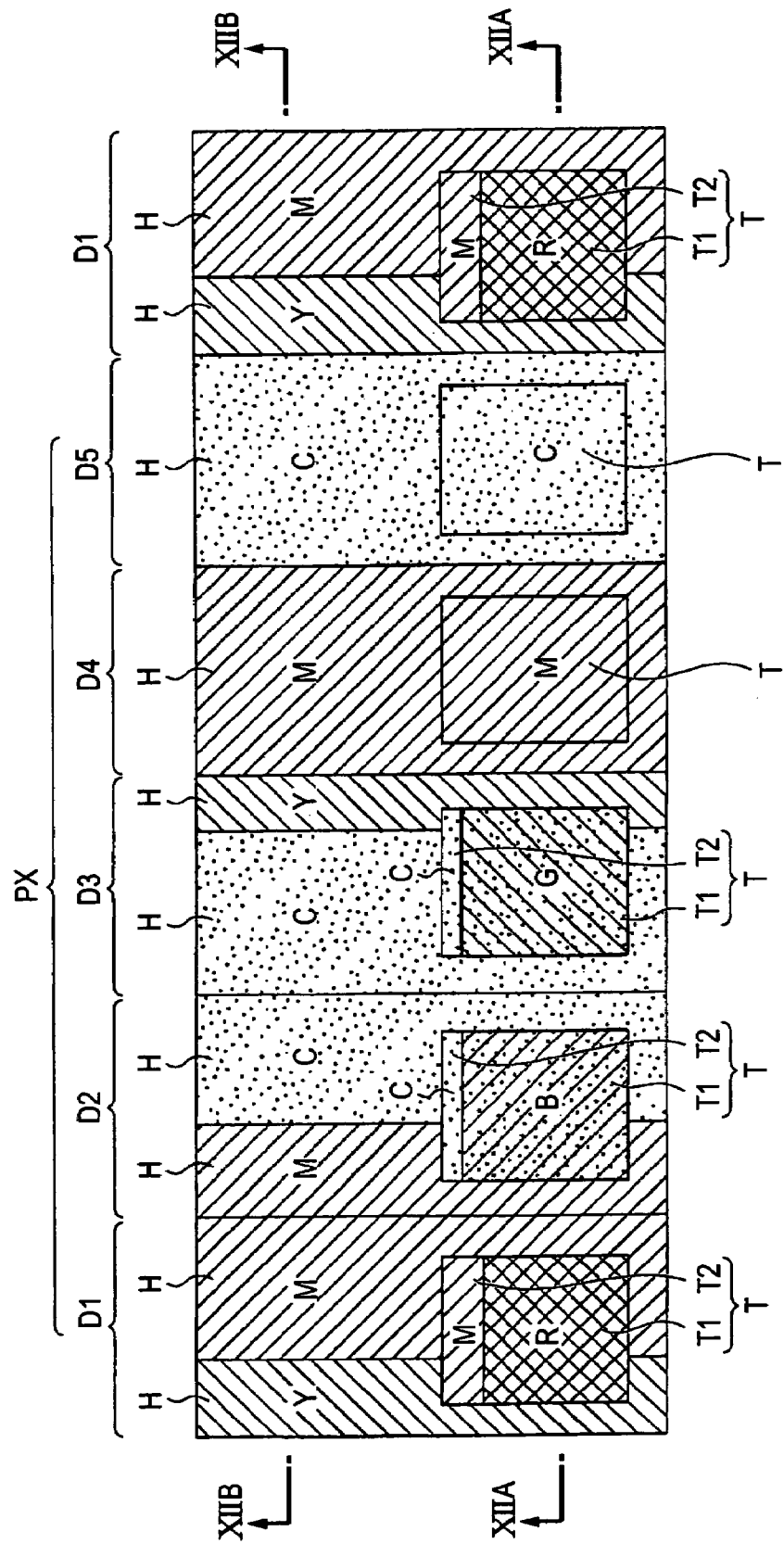
FIG. 11 is a schematic plan view illustrating the pixel structure of a liquid crystal unit according to a fifth embodiment of the invention.
Figure 12A:
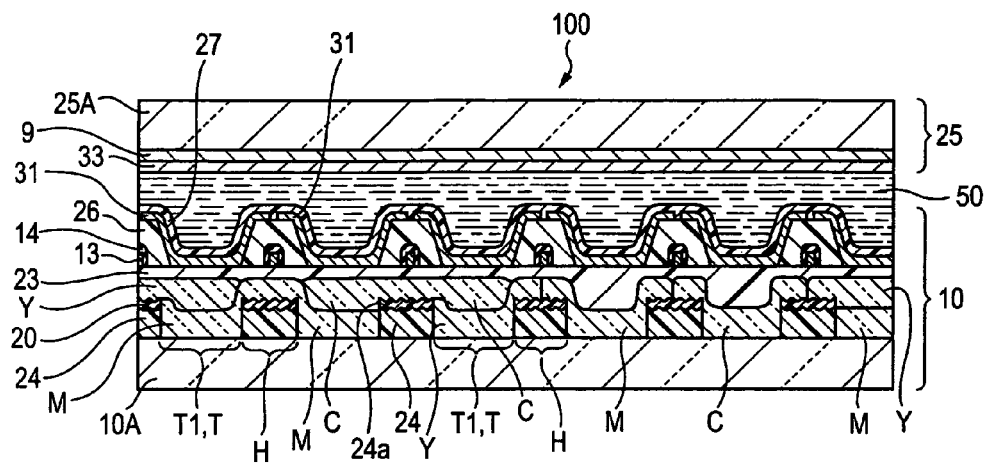
FIG. 12A is a schematic sectional view illustrating the pixel structure of the liquid crystal unit according to the fifth embodiment of the invention.
Figure 12B:
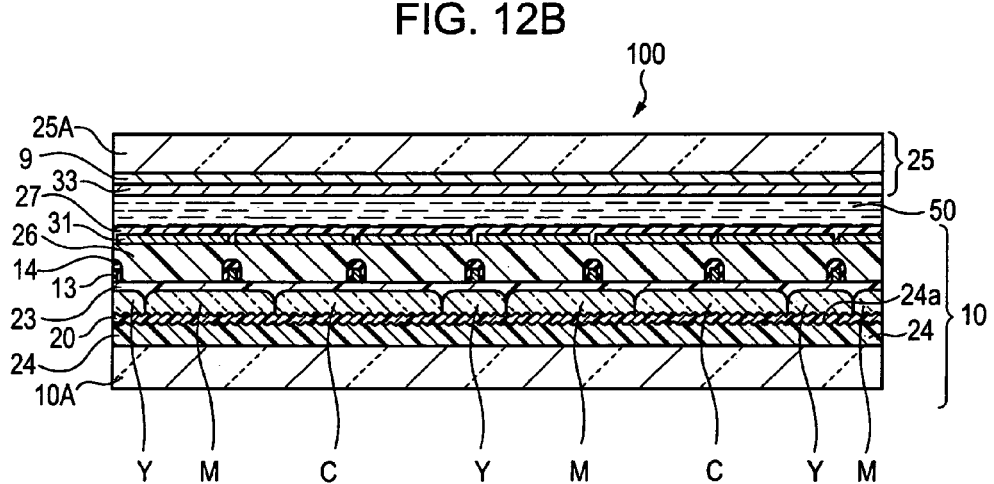
FIG. 12B is another schematic sectional view illustrating the pixel structure of the liquid crystal unit according to the fifth embodiment of the invention.

11, 12A, and 12B. FIG. 11 is a plan view of color layers in the unit pixels of the liquid crystal unit. FIG. 12A is a sectional view taken along line XIIA-XIIA in FIG. 11. FIG. 12B is a sectional view taken along line XIIB-XIIB in FIG. 11.

Referring to FIG. 11, each unit pixel PX of the liquid crystal unit includes five subpixel regions (dot regions) D1, D2, D3, D4, and D5. The subpixel region D1 includes color layers corresponding to red. The subpixel region D2 includes color layers corresponding to blue. The subpixel region D3 includes color layers corresponding to green. The subpixel region D4 includes the magenta color layer M. The subpixel region D5 includes the cyan color layer C. That is, the color filter of the liquid crystal unit according to this embodiment includes color layers corresponding to five colors. The color layer M or C may be replaced with the color layer Y.

In FIG. 11, the subpixel regions D1, D2, D3, D4, and D5 each include the reflection region H and the transmission region T to provide reflective display with external light and transmissive display with light from a backlight, respectively. A different combination of two color layers selected from the group of three color layers C, Y, and M are adjacent to each other in a plane in the reflection region H, as shown in FIG. 11, and are stacked on top of each other (bilayer structure) in the transmission region T, as shown in FIG. 12A. In addition, the transmission region T has the opening (an opening or cutout portion through which one of the two color layers is exposed) T2. The opening T2 shows an unstacked area where one of the two color layers is formed. Of the subpixel regions D1, D2, D3, D4, and D5, the subpixel regions D4 and D5 include a single color layer so as not to display the same color as the other subpixel regions.

The structures of the subpixel regions D1, D2, D3, D4, and D5 are described below in detail. The subpixel region D1 includes the color layers Y and M to transmit yellow light and magenta light which are mixed into red light. In FIGS. 11 and 12B, the color layers Y and M are adjacent to each other in a plane in the reflection region H of the subpixel region D1. In FIGS. 11 and 12A, the transmission region T has the stacked area T1, where the color layers Y and M are stacked on top of each other, and the opening T2, which is formed in the stacked area T1. The color layer M is exposed through the cut portion of the color layer Y; that is, only the color layer M is disposed in the opening T2.

The subpixel region D2 includes the color layers C and M to transmit cyan light and magenta light which are mixed into blue light. In FIGS. 11 and 12B, the color layers C and M are adjacent to each other in a plane in the reflection region H of the subpixel region D2. In FIGS. 11 and 12A, the transmission region T has the stacked area T1, where the color layers C and M are stacked on top of each other, and the opening T2, which is formed in the stacked area T1. The color layer C extends over the cut portion of the color layer M (the underlying layer); that is, only the color layer C is disposed in the opening T2.

The subpixel region D3 includes the color layers C and Y to transmit cyan light and yellow light which are mixed into green light. In FIGS. 11 and 12B, the color layers C and Y are adjacent to each other in a plane in the reflection region H of the subpixel region D3. In FIGS. 11 and 12A, the transmission region T has the stacked area T1, where the color layers C and Y are stacked on top of each other, and the opening T2, which is formed in the stacked area T1. The color layer C extends over the cut portion of the color layer Y; that is, only the color layer C is disposed in the opening T2.

The subpixel region D4 includes only the color layer M to transmit magenta light. In this embodiment, two of the group of three colors, namely cyan, yellow, and magenta, are mixed into a single color; of the five subpixel regions D1, D2, D3, D4, and D5, therefore, the subpixel regions D4 and D5 include a single color layer so that color layers of five colors can be provided. The subpixel region D4 includes only the color layer M to transmit magenta light. In FIGS. 11, 12A, and 12B, specifically, the transmission region T of the subpixel region D4 includes only the color layer M, unlike the subpixel regions D1, D2, and D3, where two color layers are stacked on top of each other. Also, the reflection region H of the subpixel region D4 includes only the same single color layer as the reflection region H, unlike the subpixel regions D1, D2, and D3, where two color layers are adjacent to each other in a plane. That is, the overall subpixel region D4 is covered with the single color layer M.

The subpixel region D5 includes only the color layer C to transmit cyan light. In FIGS. 11, 12A, and 12B, specifically, the transmission region T of the subpixel region D5 includes only the color layer C, unlike the subpixel regions D1, D2, and D3, where two color layers are stacked on top of each other. Also, the reflection region H of the subpixel region D5 includes only the same color layer as the reflection region H, unlike the subpixel regions D1, D2, and D3, where two color layers are adjacent to each other in a plane. That is, the overall subpixel region D5 is covered with the single color layer C.

According to this embodiment, a color filter substrate having color layers of five colors can be provided by forming the subpixel regions D1, D2, and D3, which display the primary colors, namely red, green, and blue, and the subpixel regions D4 and D5, which display colors other than the three colors. This color filter substrate enables a larger range of color reproduction to provide a liquid crystal unit with higher resolution and a wider color range.

Electronic Device

Figure 13:
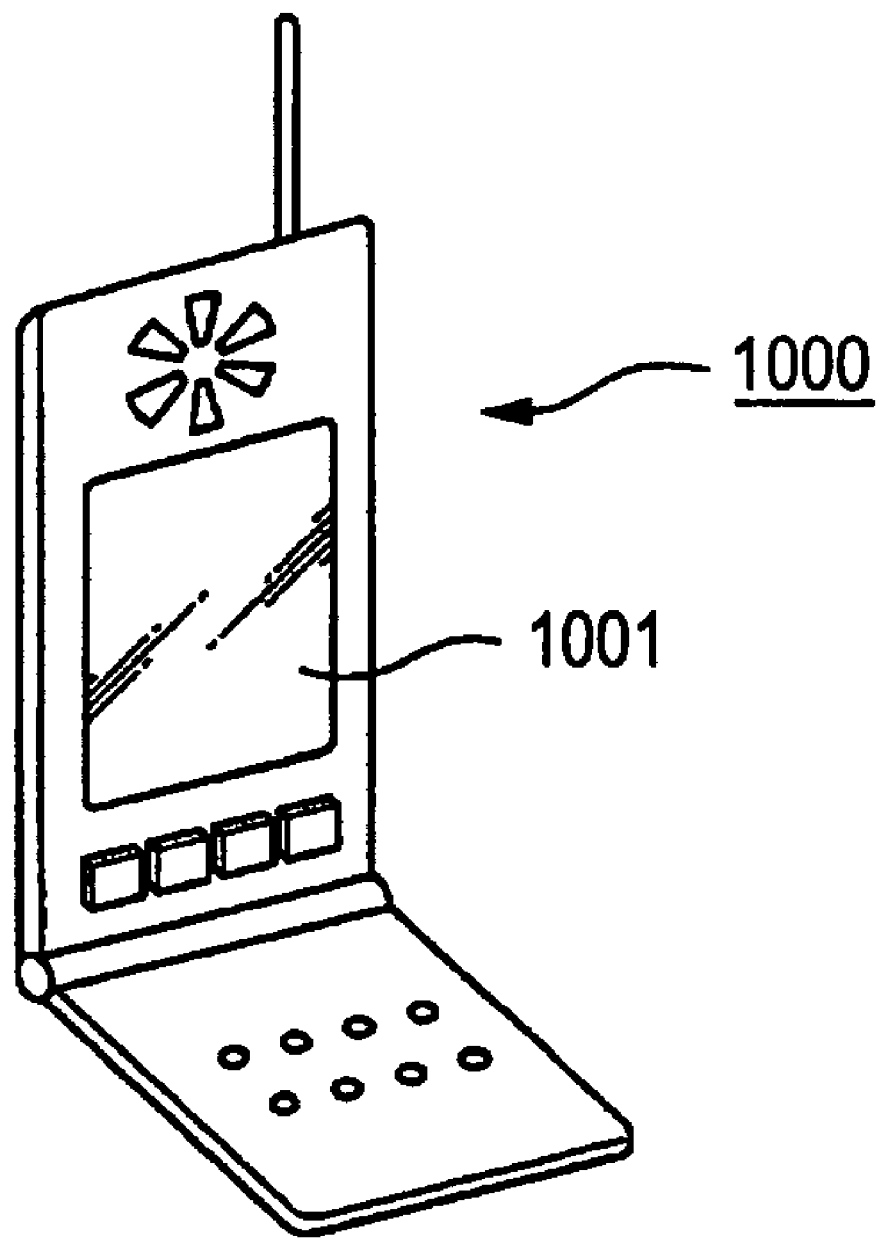
FIG. 13 is a perspective view of an electronic device according to an embodiment of the invention.

A specific example of an electronic device having the liquid crystal unit according to any of the above embodiments is described below. FIG. 13 is a perspective view of an example of a cellular phone. In FIG. 13, a cellular phone 1000 has a display 1001 including the liquid crystal unit. The liquid crystal unit enables the color control of red, green, and blue to provide an electronic device having a display with a suitable white balance.

What is claimed is:

1. A color filter substrate, comprising:
    a substrate; and
    color layers of different colors which are disposed on the substrate in unit pixels that each include subpixels, the subpixels each further including:
        a reflection region where light entering the pixels is reflected, including a combination of two different color layers selected from the color layers for each of the subpixels, the two color layers being adjacent to each other in a plane;
        a transmission region where light entering the pixels is transmitted, including the combination of the two different color layers, the two color layers being arranged on top of each other; and
        the transmission region of at least one of the subpixels having an area where only one of the two different color layers is formed.

2. The color filter substrate according to claim 1, further comprising:
    a reflective film provided in the reflection region that is disposed between the two color layers and the substrate.

3. The color filter substrate according to claim 1, the area where one of the two different color layers is formed being provided on both sides of the transmission region.

4. The color filter substrate according to claim 1, the area where one of the two different color layers is formed being a cutout portion of the other color layer in the transmission region.

5. The color filter substrate according to claim 1, the area where one of the two different color layers is formed being an opening provided in the other color layer in the transmission region.

6. The color filter substrate according to claim 1, the colors of the color layers being cyan, yellow, and magenta.

7. The color filter substrate according to claim 1, the two different color layers in the reflection region of at least one of the subpixels having different surface areas.

8. The color filter substrate according to claim 1, the two color layers being formed across boundaries between the adjacent subpixels.

9. The color filter substrate according to claim 1, further comprising:
   a thickness-adjusting portion disposed between the color layers and the substrate in the reflection region to adjust the thickness of the color layers.

10. The color filter substrate according to claim 1, further comprising:
    a planarizing layer covering the top color layers in the reflection region and the transmission region.

11. The color filter substrate according to claim 6, the yellow color layer having a smallest area among the cyan, yellow, and magenta color layers in the reflection region and the transmission region.

12. A liquid crystal unit, comprising:
    a pair of substrates facing each other;
    a liquid crystal layer held between the substrates;
    a reflective film; and
    color layers of different colors which are provided in unit pixels that each include subpixels, the subpixels each further including:
        a reflection region where light entering the pixels is reflected, including a combination of two different color layers selected from the color layers for each of the subpixels, the two color layers being adjacent to each other in a plane;
        a transmission region where light entering the pixels is transmitted, including the combination of the two different color layers, the two color layers being arranged on top of each other; and
    the transmission region of at least one of the subpixels having an area where only one of the two different color layers is formed.

13. An electronic device, comprising:
    a display including the liquid crystal unit according to claim 12.

* * * * *